United States Patent [19]
Moore et al.

[11] Patent Number: 5,925,248
[45] Date of Patent: Jul. 20, 1999

[54] DISK FILTER SECTOR HAVING AN ATTACHMENT SYSTEM OUTSIDE OF FLOW AREA

[75] Inventors: Richard D. Moore, Auburn; Richard Gustafson, Manchester; Richard Moody, New Boston, all of N.H.

[73] Assignee: Minerals Processing Techniques, Inc., Auburn, N.H.

[21] Appl. No.: 08/897,113

[22] Filed: Jul. 18, 1997

[51] Int. Cl.[6] ................................................ B01D 39/00
[52] U.S. Cl. ........................ 210/331; 210/345; 210/486
[58] Field of Search ............................... 210/323.1, 330, 210/331, 343, 346, 347, 486, 497.3, 498

[56] References Cited

U.S. PATENT DOCUMENTS

| | | | |
|---|---|---|---|
| 2,781,133 | 2/1957 | Thompson | 210/199 |
| 3,485,376 | 12/1969 | Peterson et al. | 210/331 |
| 3,539,050 | 11/1970 | Davis et al. | 210/486 |
| 3,659,716 | 5/1972 | Peterson et al. | 210/247 |
| 3,679,061 | 7/1972 | Davis | 210/486 |
| 3,917,534 | 11/1975 | Moore | 210/331 |
| 3,960,729 | 6/1976 | Peterson et al. | 210/232 |
| 4,032,442 | 6/1977 | Peterson . | |
| 4,139,472 | 2/1979 | Simonson | 210/232 |
| 4,152,267 | 5/1979 | Davis et al. | 210/331 |
| 4,159,951 | 7/1979 | Davis | 210/331 |
| 4,216,094 | 8/1980 | Solum | 210/331 |
| 4,285,817 | 8/1981 | Barthelmey | 210/488 |
| 4,446,021 | 5/1984 | Aufderhaar et al. | 210/378 |
| 4,931,179 | 6/1990 | Nilsson | 210/331 |
| 5,227,065 | 7/1993 | Strid | 210/331 |
| 5,330,644 | 7/1994 | Nilsson | 210/323.1 |

*Primary Examiner*—David A. Reifsnyder
*Attorney, Agent, or Firm*—Bourque and Associates, PA

[57] ABSTRACT

A disc filter sector having an improved attachment system includes a sector base and a sector neck. The sector base includes stiffening members that extend through the sector base and include an attachment end, such as a threaded fastener or region, at the neck mating end of the sector base. The sector neck includes a hold down member proximate the base mating end of the sector neck. To attach the sector base to the sector neck, a mating attachment member, such as a bolt extends through the hold down member of the sector neck and engages with the attachment end of the stiffening members. In one embodiment, the stiffening members, attachment end, and mating attachment members are disposed outside of the flow regions in the sector base and sector neck.

24 Claims, 5 Drawing Sheets

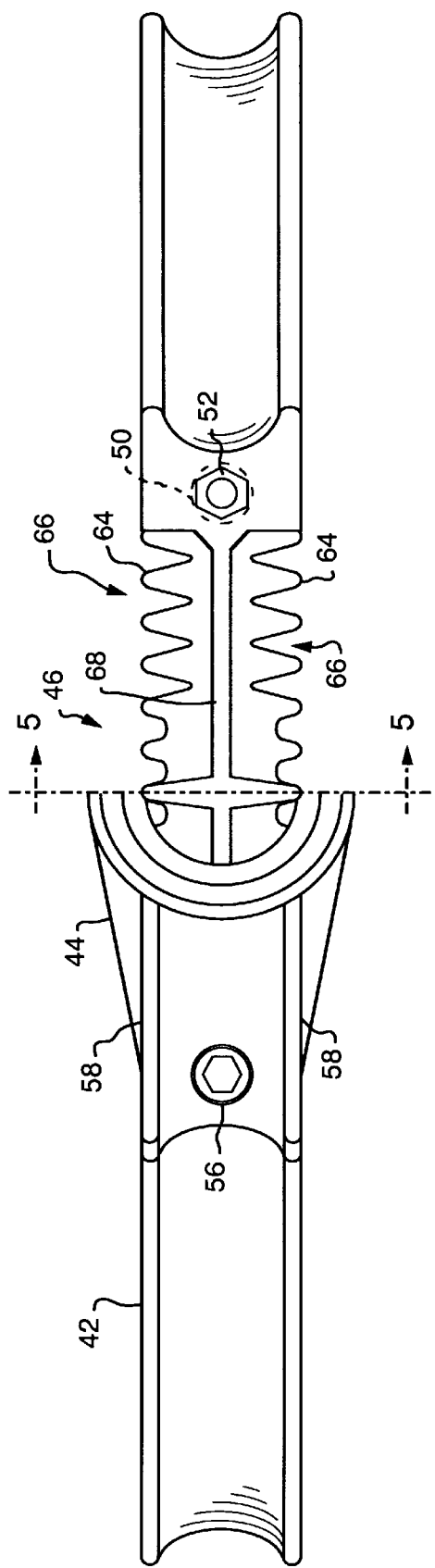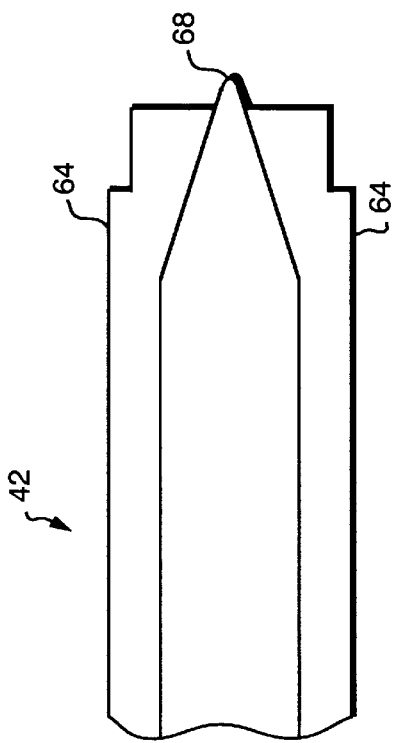

5,925,248

DISK FILTER SECTOR HAVING AN ATTACHMENT SYSTEM OUTSIDE OF FLOW AREA

FIELD OF THE INVENTION

The present invention relates to disc filter sectors and in particular, a disc filter sector that filters a mineral concentrate from an aqueous solution and has an attachment system outside of the flow area of the filtered liquid.

BACKGROUND OF THE INVENTION

During the processing of ore for the purpose of extracting minerals, numerous grinding, cleaning and separation processes are conducted. Most of the processing, such as grinding, is performed in water resulting in a mineral ore concentrate of the desired particle size in an aqueous suspension or slurry. The aqueous slurry is subjected to a filtering process to obtain dry ore concentrate for pelletizing or other purification processes.

One such filtration process utilizes a rotary disc filter 10, FIG. 1, that includes a plurality of generally fan shaped filter sectors 12 covered by a filter bag 22 or other type of filtering membrane. The filter sectors 12 are secured at close intervals around a rotatable support drum or shaft 14, for example, with a rod 16 and bracket 18. The filter sectors can then be rotated into and out of the slurry containing the concentrate or particulate matter to be filtered.

The disc filter 10 further includes conduits 20 to which the filter sectors 12 are fluidly connected. A vacuum is applied to draw water through the filter bag 22, into the filter sectors 12 and into the conduit 20, accumulating concentrate on the outer surface of the filter bag 22 as the sectors 12 rotate through the slurry. When the sectors 12 rotate out of the slurry, pressurized air is applied through the conduits 20 and the filter sectors 12 to cause the concentrate on the filter bag 22 to drop off into collection bins.

As a result of the highly abrasive qualities of the ore or other minerals being filtered, the filter sector 12 is subjected to abrasion and wear if any of the abrasive particles go through the filter bag 22. Various types of filter sectors have been used in disc filters, such as wooden filter sectors, metal filter sectors and plastic filter sectors. Plastic filter sectors are particularly desirable because of their resistance to corrosive materials and because of their relatively light weight.

One type of plastic filter sector 12, FIG. 2, typically includes a sector base 24 and a sector neck 26. The sector base 24 includes a number of grooves or channels 28 such that the liquid flows along the grooves or channels 28 of the sector base 24 and into the sector neck 26. To provide structural rigidity to the sector base 24, pipes 30a, 30b extend through the sector base 24. Threaded rods 32a, 32b extend through the pipes 30a, 30b and are coupled with nuts 34a, 34b to secure the sector base 24 to the sector neck 26.

Although this type of filter sector 10 is relatively lightweight and the sector body 24 resists the abrasive and corrosive effects of the slurry, a number of problems remain in the attachment of the sector base 24 to the sector neck 26. In particular, the pipes 30a, 30b extend into the flow path or region within the sector neck 26. If fine mineral particles pass through the filter bag or if a hole is formed in the filter bag, the pipes 30a, 30b are exposed to the abrasive mineral particles causing the pipes to wear through and the neck to blow out. The water and mineral particles may also seep into the pipes 30a, 30b causing corrosion within the pipes.

Another problem with this disc filter sector design is that the threaded rods 32a, 32b, extending through the pipes 30a, 30b and coupled by the nuts 34a, 34b, make the replacement of the neck 26 difficult, for example, when the abrasive mineral particles have worn through the neck 26 or the pipes 30a, 30b.

Accordingly, a need exists for a disc filter sector having an improved attachment system that facilitates attachment of the sector base to the sector neck and that is not subject to the abrasion, corrosion and other damaging effects caused by the mineral particles, concentrate or liquid. What is also desired is a filter sector in which the sector body is securely attached to the sector neck while providing a smooth flow transition between the sector base and the sector neck.

SUMMARY OF THE INVENTION

The present invention features a disc filter sector comprising a sector base and a sector neck. The sector base includes a flow region formed in at least one side of the sector base. The sector base further includes first and second stiffening members, such as pipes, rods or similar devices, molded within and surrounded by the sector base. Each of the first and second stiffening members have an attachment end, such as a nut or other type of threaded region, disposed within a neck mating end of the sector base.

The sector neck includes a flow region in fluid communication with the flow region of the sector base when a base mating end of the sector neck is coupled to the neck mating end of the sector base. The sector neck further first and second hold down members at the base mating end, each having an aperture for aligning with a respective attachment end of the first and second stiffening members. One or more mating attachment members, such as bolts, extend through the respective apertures in the first and second hold down members to engage with the attachment end on the respective stiffening member and attach the sector base to the sector neck. According to one preferred embodiment, the first and second hold down members of the sector neck abut the neck mating end of the sector base such that the first and second stiffening members, attachment ends, and mating attachment members are located outside of the flow region in the sector neck. In this embodiment, the stiffening members preferably extend within the sector base parallel to one another.

In an alternative embodiment, a spacer member is disposed around each mating attachment member to protect against the flow and to prevent corrosion and abrasion. In this embodiment, the stiffening members extend parallel to the radial edges of the sector base.

The preferred embodiment of the sector base includes a solid body portion having a plurality of ribs that define one or more channels in the flow region of the sector base. In one example, the sector base includes an external body portion made of polyethylene and having the ribs, and an internal body portion made of urethane foam. The preferred embodiment of the sector neck is made of polyurethane.

The stiffening members preferably include elongate rigid members, such as pipes. The attachment end can include a nut secured or welded to the pipe at the neck mating end of the sector base, or a threaded region formed within the pipe. One example of the mating attachment member includes a bolt that extends through the aperture in the hold down members and threadably engages with the nuts or threaded region of the stiffening members at the neck mating end of the sector base. The attachment of the sector neck and sector base is thereby easily made while maintaining the attachment outside of the flow region and preventing abrasion and corrosion.

DESCRIPTION OF THE DRAWINGS

These and other features and advantages of the present invention will be better understood by reading the following detailed description, taken together with the drawings wherein:

FIG. 4 is a top, partially cutaway view of the filter sector, according to the present invention;

FIG. 5 is a side, cross-sectional view of the sector base of the present invention taken along line 5—5 in FIGS. 3 and 4.

DETAILED DESCRIPTION OF THE PREFERRED EMBODIMENT

Figure 1:
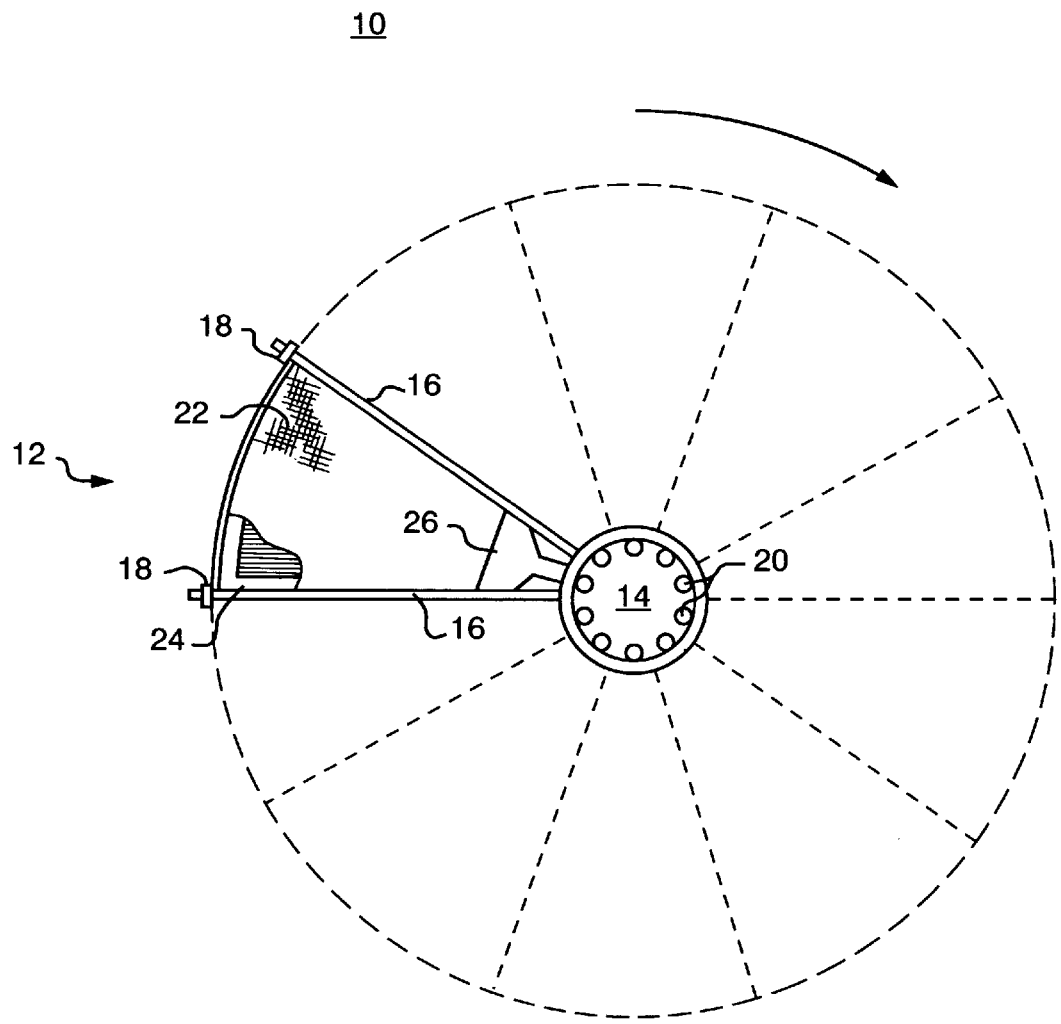
FIG. 1 is a side schematic view of a rotary disc filter according to the prior art.
Figure 2:
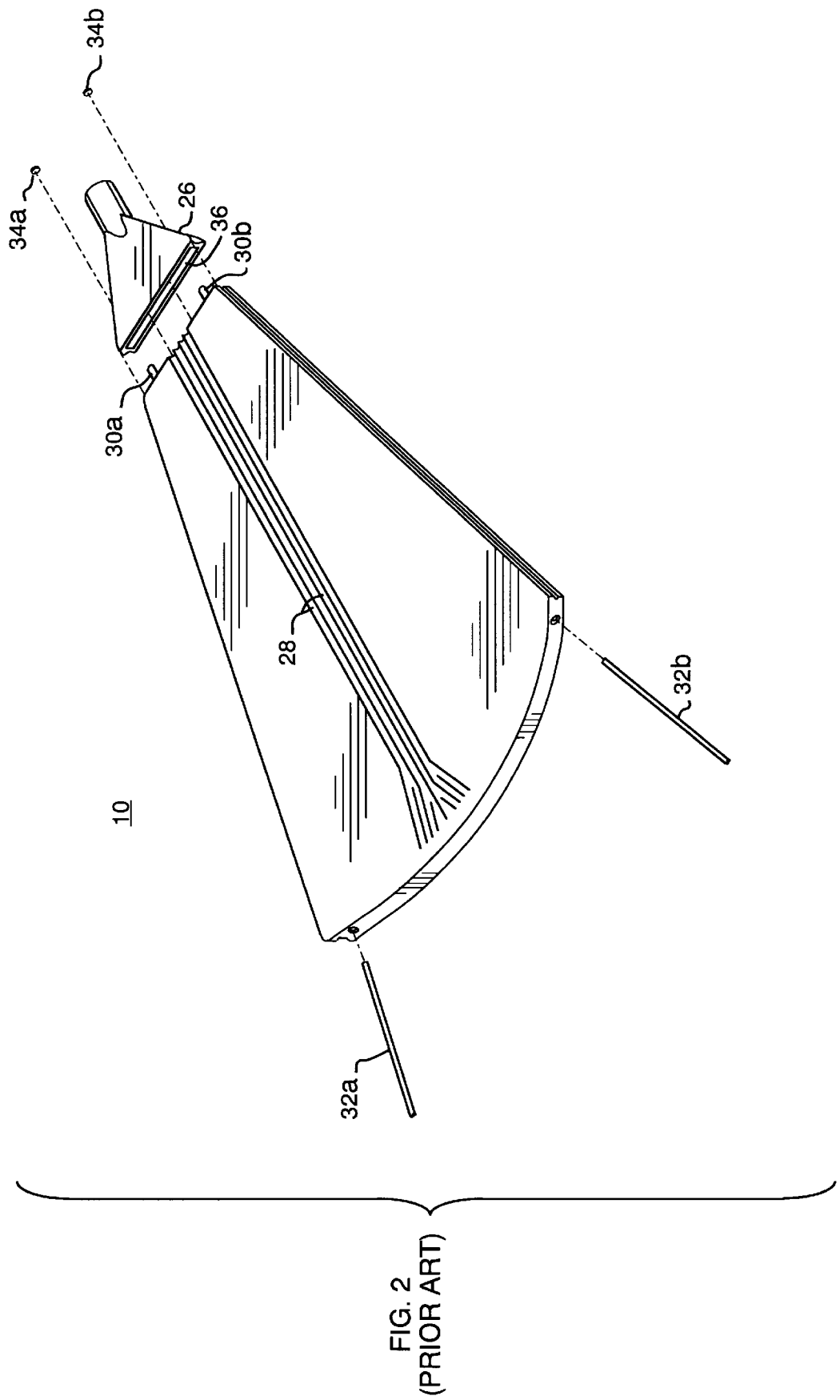
FIG. 2 is an expanded view of a filter sector according to the prior art.
Figure 3:
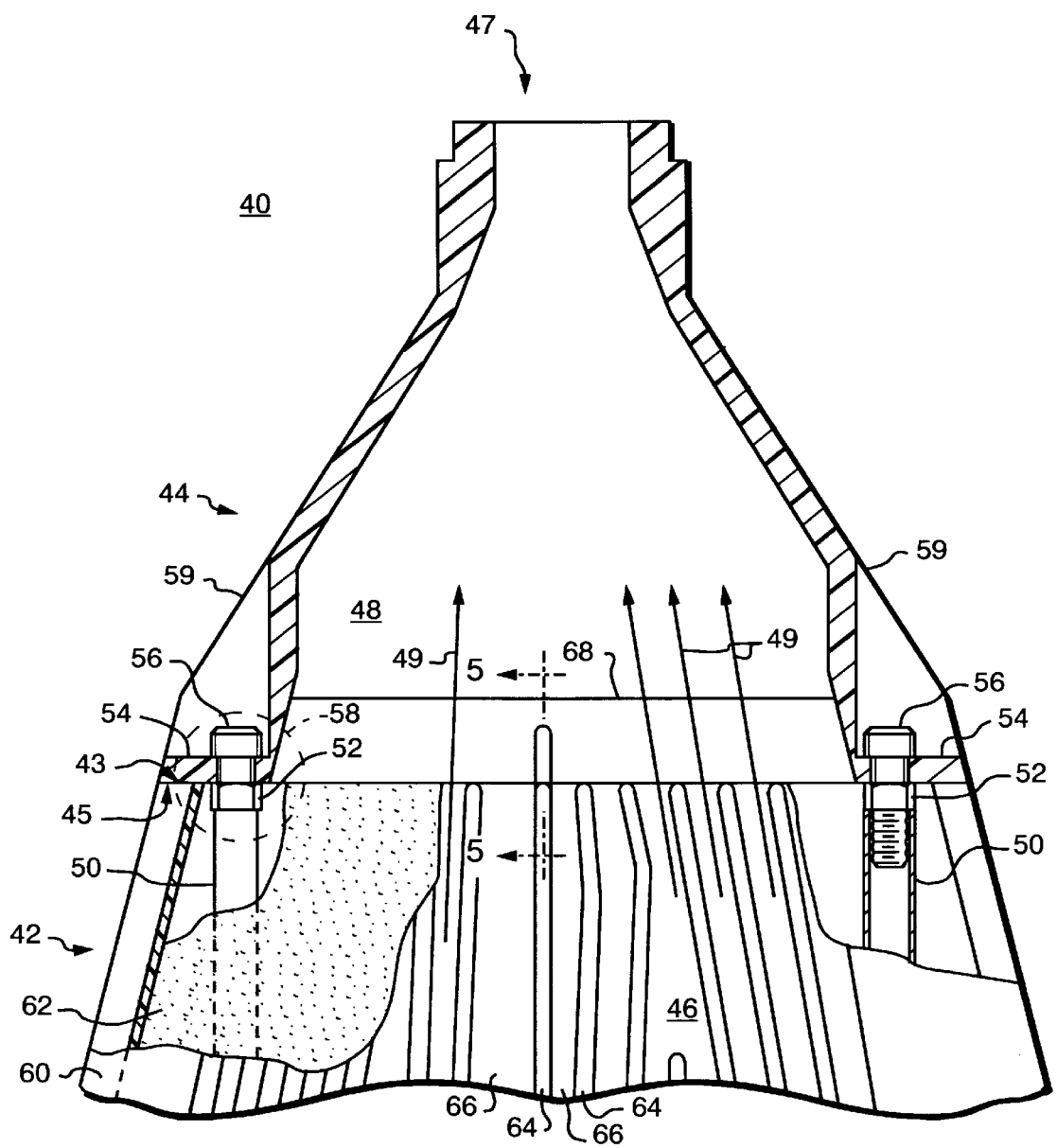
FIG. 3 is a cross-sectional view of a filter sector having a sector base, sector neck, and attachment system, according to one preferred embodiment of the present invention.

A disc filter sector 40, FIG. 3, according to the present invention, is typically used in a rotary disc filter for filtering ore concentrate or other types of minerals or particulate matter from an aqueous slurry as is well known in the art. The disc filter sector 40 includes a sector base 42 attached to a sector neck 44 at respective neck mating and base mating ends 43, 45. The sector base 42 has sector base flow region 46 in fluid communication with a neck flow region 48 such that fluid is drawn along and into the sector base flow region 46 and into the neck flow region 48, as shown generally by arrows 49.

The sector base 42 includes first and second stiffening members 50, such as pipes, channels or similar structures, extending within the sector base 42, to provide structural rigidity and stiffen the sector base 42. The stiffening members 50 have an attachment end 52, such as a nut or other threaded member or region, proximate the neck mating end 43 of the sector base 42 outside of sector 40 and outside of the sector neck and base flow regions 48 and 46. By terminating proximate the neck mating end 43 of the sector base 42, the attachment ends 52 of the stiffening members 50 do not extend into the flow region 48 of the neck 44. In one example, the attachment end 52 includes a nut or other threaded member welded or otherwise secured to the pipe. Alternatively, attachment end 52 can be formed as a "helicoil" inserted within the pipe or by cutting threads on the inside of the pipe.

One preferred embodiment of the sector neck 44 includes first and second hold down members 54 at the base mating end 45 of the sector neck 44. The hold down members 54 receive one or more mating attachment members 56, such as threaded bolts, to secure the mating ends 43, 45 of the sector base 42 and the sector neck 44 together. In this embodiment, the stiffening members 50 in the sector base 42 extend substantially parallel to one another such that the mating attachment members 56 engage with the respective attachment ends 52 without interfering with the sector neck 44.

The stiffening members 50, attachment ends 52, and mating attachment members 56 thereby form an improved attachment system 58 that is located outside the flow region 48 within the sector neck 44. Any concentrate that enters the filter sector 40 can flow smoothly through the neck without abrading, corroding or otherwise damaging the attachment system 58. The attachment system 58 also allows the sector neck 44 to be easily replaced by removing the mating attachment members 56. The nuts or other threaded members used on the attachment ends 52 and the bolts used for the mating attachment members 56 are typically made of stainless steel or another suitable material and can be coated with a coating such as LOCTITE 24 REMOVABLE.

The sector neck 44 preferably has a generally "bell" shape molded from polyurethane to reduce the weight and including a transition from a rectangular flow region proximate neck mating end 43, to a round flow region 47 to improve flow efficiency. The present invention, however, contemplates sector necks made of cast iron or other materials and having various shapes and flow regions.

One embodiment of the sector neck 24 further includes one or more side supports or flanges 59 extending from the sector neck 44 to provide support for a filter bag to be wrapped around the sector base 42 and sector neck 44. The mating attachment member 56 preferably includes an Allen head or other socket type bolt, that can easily be tightened or loosened between the side flanges 59.

The sector base preferably has a generally "fan" shape and includes a solid body having an external body portion 60 made of polyethylene or another suitable material, and an internal body portion 62 made of a urethane foam or another suitable material. According to one example, the external body portion 60 of the sector base 42 is rotationally molded from a polyethylene material with the rigid stiffening members 50 therein. The external body portion 60 of the sector base 42 is then placed in a press to keep the sector base from bulging while filling the external body portion 60 with urethane foam, forming the internal body portion 62.

The external body portion 60 of the sector base 42, FIG. 4, includes a plurality of ribs 64 that define a plurality of grooves or channels 66 within the sector base flow region 46, for directing the water or other fluid medium into the flow region 48 of the sector neck 44. As shown in FIG. 4, the attachment ends 52 are preferably disposed outside of the channels 66 in the sector base 42. The preferred embodiment of the sector base 42 also includes a ramp 68, FIG. 5, extending from the sector base flow region 46 to the sector neck flow region 48 to provide a smooth flow between the sector base 42 and sector neck 44.

Figure 6:
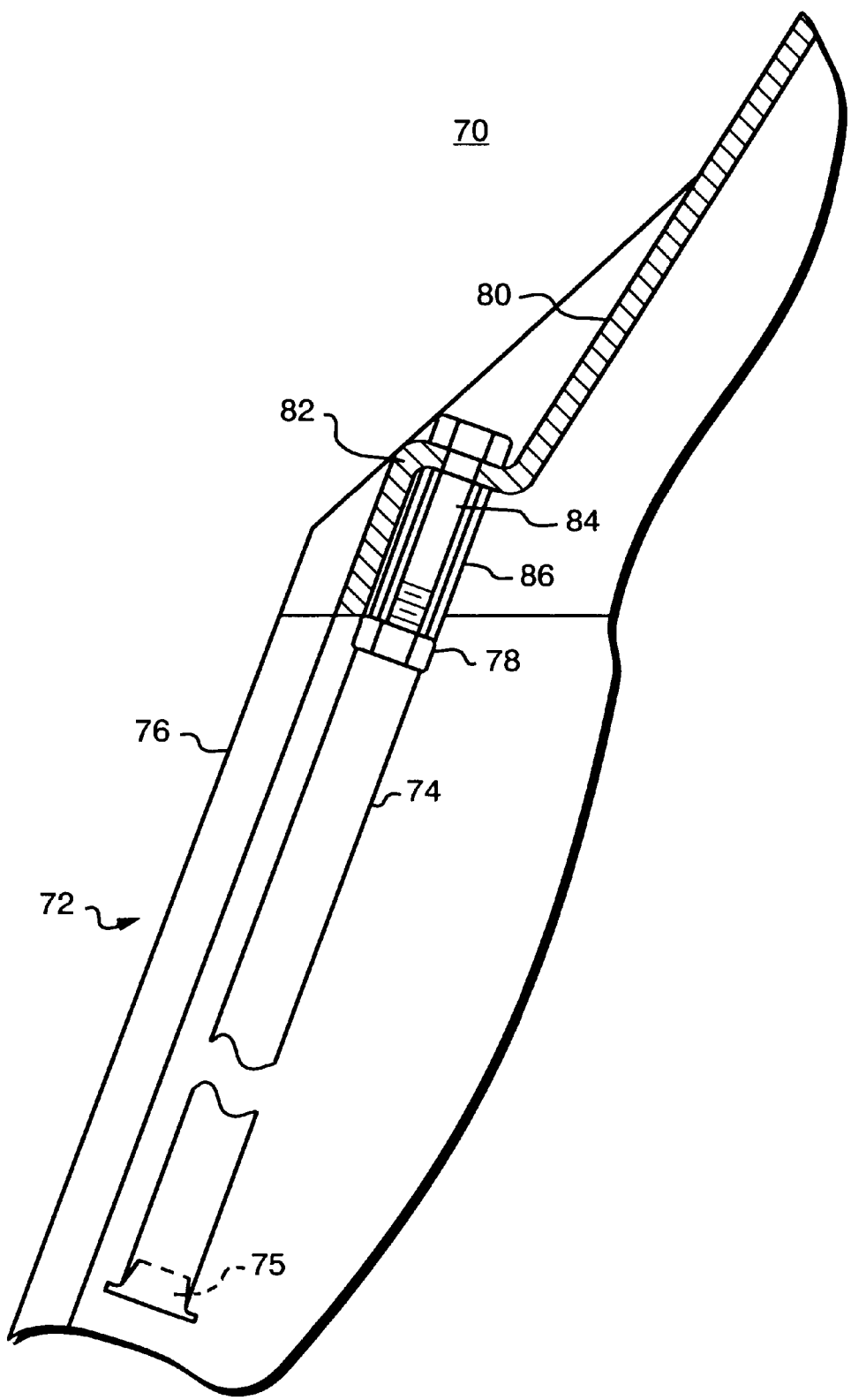
FIG. 6 is a side, cross-sectional view of a filter sector having a sector body, sector neck and attachment system, according another embodiment of the present invention.

According to another embodiment of the disc filter sector 70, FIG. 6, a sector base 72 has stiffening members 74, such as pipes, that extend parallel to a radial edge 76 of the sector base 72. As with the previous embodiment, the stiffening member has an attachment end 78, e.g. a nut or other threaded region welded or otherwise secured to or formed in the stiffening member 74. Where a pipe is used for a stiffening member 74, the pipe typically includes a plug 75 at the end opposite the attachment end 78.

In this embodiment, the sector neck 80 includes a hold down member 82 that does not abut the neck mating end of the sector base 72. A mating attachment member 84 extends throughout the hold down member 82 and into the attachment end 78 to secure the sector neck 80 to the sector base 72. A spacer 86 optionally extends around the mating attachment member 84. The spacer 86 is preferably made of stainless steel, polyurethane or other suitable material and prevents the flow of fluid and concentrate through the sector neck 80 from damaging the mating attachment member 84 and from entering the stiffening member 74. This embodiment facilitates replacement of the sector neck 80, by providing the attachment end 78, such as a nut or threaded region, on the rigid stiffening member 74 and by using attachment members 84, such as bolts, that extend through the sector neck 80.

Accordingly the disc filter sector of the present invention includes an attachment system that facilitates removal and replacement of the sector neck. The attachment system is also located outside of the flow region to protect the attachment system from the abrasive and corrosive effects of the fluid and concentrate within the flow region, thereby preventing damage to the filter sector.

Modifications and substitutions by one of ordinary skill in the art are considered to be within the scope of the present invention which is not to be limited except by the claims which follow.

What is claimed is:

1. A disk filter sector assembly comprising:
   a sector base having a neck mating end and a sector base flow region formed in at least one side of said sector base, said sector base including first and second stiffening members molded within and surrounded by said sector base, each of said first and second stiffening members having an attachment end disposed within said neck mating end of said sector base; and
   a sector neck having a base mating end adapted to be coupled to said neck mating end of said sector base, said sector neck defining a neck flow region extending from said base mating end of said sector neck and through said sector neck, said sector neck including first and second hold down members proximate said base mating end, each of said first and second hold down members having an aperture, for aligning with a respective attachment end of said first and second stiffening members and for receiving a mating attachment member adapted to engage with said attachment end of said first and second stiffening members, to secure said sector neck to said sector base.

2. The disk filter sector assembly of claim 1 wherein said sector base includes a solid body portion having a plurality of ribs defining at least one channel in said flow region of said sector base.

3. The disk filter sector assembly of claim 2 wherein said at least one channel includes a plurality of channels formed on both sides of said sector base.

4. The disk filter sector assembly of claim 1 wherein said sector base includes an external body portion made of polyethylene and internal body portion made of urethane foam.

5. The disk filter sector assembly of claim 1 wherein said sector base is generally fan-shaped and includes first and second radial edges.

6. The disk filter sector assembly of claim 1 wherein said first and second stiffening members are rigid elongate members.

7. The disk filter sector assembly of claim 1 wherein said first and second stiffening members are generally parallel to one another.

8. The disk filter sector assembly of claim 1 wherein said first and second stiffening members are generally parallel to first and second radial edges of said sector base.

9. The disk filter sector assembly of claim 1 wherein said attachment end includes a threaded member attached to each of said first and second stiffening members proximate said neck mating end of said sector base.

10. The disk filter sector assembly of claim 9 wherein said first and second stiffening members include first and second pipes, and wherein each said threaded member is welded to respective said first and second pipes.

11. The disk filter sector assembly of claim 1 wherein said first and second stiffening members include first and second pipes, wherein said attachment end includes a threaded region formed in each of said first and second pipes.

12. The disk filter sector assembly of claim 1 wherein said first and second hold down members extend outwardly at said base mating end of said sector neck, wherein said first and second hold down members are adapted to abut said neck mating end of said sector base when said sector neck is attached to said sector base.

13. A disk filter sector comprising:
    a sector base having a neck mating end and a sector base flow region in at least one side of said sector base, said sector base including first and second stiffening members molded within and surrounded by said sector base, each of said first and second stiffening members having an attachment end disposed within said neck mating end;
    a sector neck having a base mating end coupled to said neck mating end of said sector base, said sector neck defining a sector neck flow region in fluid communication with said sector base flow region in said sector base, said sector neck including first and second hold down portions disposed against said neck mating end of said sector base; and
    at least one attachment member extending through each of said first and second hold down members of said sector neck and engaging with a respective said attachment end of said first and second stiffening members proximate said neck mating end of said sector base, wherein said first and second stiffening members proximate said neck mating end of said sector base, wherein said first and second stiffening members, each said attachment end, and each said attachment member are located outside of said sector neck flow region in said sector neck.

14. The disk filter sector of claim 13 wherein said sector base includes a solid body portion having a plurality of ribs defining at least one channel within said sector base flow region.

15. The disk filter sector of claim 14 wherein said plurality of ribs are disposed on both sides of said sector base to form a plurality of channels on both sides of said sector base.

16. The disk filter sector of claim 15 wherein said sector base includes a ramped portion extending from said neck mating end of said sector base into said sector neck flow region of said sector neck.

17. The disk filter sector of claim 13 wherein said sector base is generally fan-shaped and includes first and second radial edges.

18. The disk filter sector of claim 17 wherein said first and second stiffening members are generally parallel to one another.

19. The disk filter sector of claim 13 wherein said sector neck is made of polyurethane.

20. The disk filter sector of claim 13 wherein said attachment end includes threaded member selected from the group consisting of a nut fixed to each of said first and second stiffening members and a threaded insert threaded within each of said first and second stiffening members, and wherein said attachment member includes a bolt threadably engaged with said threaded member.

21. A disk filter sector base comprising:

a body portion having a generally fan shape, said body portion including a plurality of ribs extending from both sides of said body portion defining a plurality of channels; and first and second stiffening members molded within and surrounded by said body portion, each of said first and second rigid stiffening members including an internally threaded attachment end disposed substantially flush with said neck mating end of said body portion, wherein said first and second stiffening members are generally parallel to one another, and wherein each said threaded attachment end is disposed outside of said channels.

22. The disk filter sector base of claim 21 further including a ramp extending from said neck mating end of said body portion.

23. The disk filter sector base of claim 21 wherein said body portion includes an external body portion made of polyethylene and internal body portion made of urethane foam.

24. The disk filter sector base of claim 21 wherein said first and second rigid members include first and second pipes, and wherein each said attachment end includes a nut fixed to respective said first and second pipes.

* * * * *